United States Patent

Orner

[15] 3,638,507
[45] Feb. 1, 1972

[54] PRELOADED BALL-BEARING SCREW AND NUT MECHANISM

[72] Inventor: Harry Orner, 2479 Glenn Canyon Road, Altadena, Calif. 91001

[22] Filed: Feb. 26, 1970

[21] Appl. No.: 14,372

[52] U.S. Cl. ............................... 74/424.8, 74/409, 74/441, 74/459
[51] Int. Cl. .................. F16h 1/18, F16h 55/18, F16h 55/02
[58] Field of Search ........................ 74/459, 441, 409, 424.8

[56] References Cited

UNITED STATES PATENTS

| | | | |
|---|---|---|---|
| 2,749,812 | 6/1956 | Wetzel | 74/441 X |
| 2,643,845 | 6/1953 | Baker | 74/441 X |
| 2,567,483 | 9/1951 | Hotine | 74/424.8 |
| 2,842,007 | 7/1958 | Brant | 74/459 X |
| 2,933,941 | 4/1960 | Millns | 74/459 X |

*Primary Examiner*—Leonard H. Gerin

[57] ABSTRACT

This invention is a device for adjustably preloading a ball bearing screw and nut mechanism. The nut structure is provided with an intermediate reduced area section including an annular member with a coacting screw mechanism adjustably actuated to axially stress the reduced area section to change the relative position of the helical groove in the nut structure on each side of the intermediate section, relative to the helical groove of the screw, to remove the end play of the nut to the screw.

14 Claims, 5 Drawing Figures

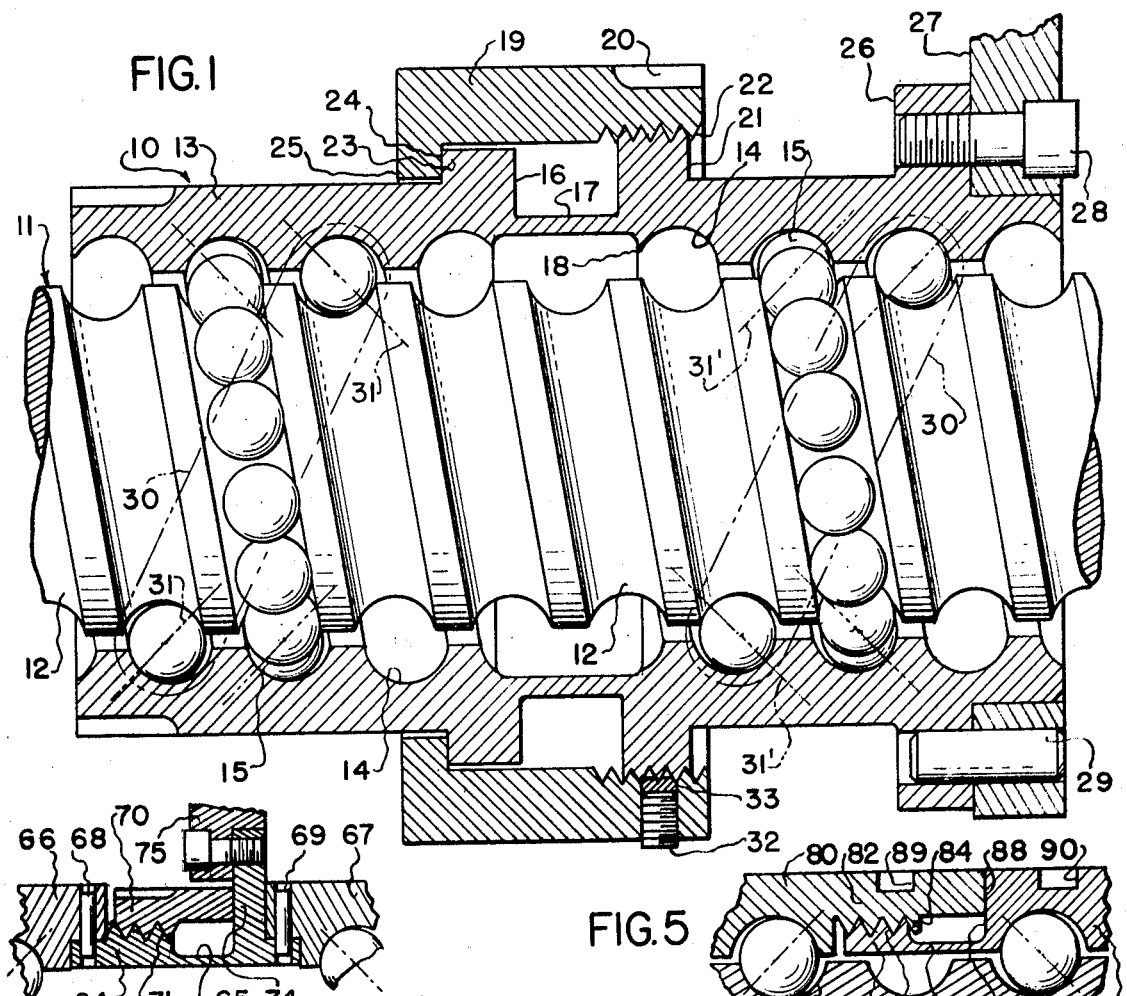

3,638,507

PRELOADED BALL-BEARING SCREW AND NUT MECHANISM

Preloaded ball-bearing screw and nut mechanism are used in machine tools and reference is made to my prior U.S. Pat. No. 2,982,125 for Reciprocable Feed Mechanism, and U.S. Pat. No. 3,234,810 for Preloaded Ball Bearing Screw and Nut Mechanism.

In the prior art preloading ball-bearing screw and nut mechanism required skilled effort and hand fitting to obtain a relation of the end surfaces of the nut bodies to abut for proper preload values. This is obviated by the present invention which provides a micrometer control of adjustment for the preload.

One of the primary objects of this invention is to provide a unitary ball-bearing nut construction that can be adjusted to reduce end play on a ball-bearing screw.

Another object of this invention is to provide a nut construction that can be adjusted for preload without removing the assembly from the machine.

Another object of this invention is to provide a preloaded ball-bearing nut construction of maximum rigidity.

Another object of this invention is to provide a ball-bearing screw and nut mechanism that can be adjusted with micrometer accuracy for proper preload.

Another object of this invention is to provide an adjustable mechanism for ball-bearing nut construction that can be used with two independent ball-bearing nuts to provide a unitary preloaded assembly.

Another object of this invention is to provide an economical product as an article for manufacturing.

Other advantages of this invention will become fully apparent in the following specifications and drawings.

In the drawings:

FIG. 1 is a longitudinal sectional view showing an embodiment of this invention;

FIG. 2 is a fragmentary view, similar to FIG. 1, showing a modification of this invention;

FIG. 3 is a longitudinal sectional view showing another modification of this invention;

FIG. 4 is a fragmentary view, similar to FIG. 2, showing another modification of this invention; and FIG. 5 is a fragmentary view, similar to FIG. 2, showing another modification of this invention.

Referring to FIG. 1, the ball-bearing nut structure 10 is mounted on a ball-bearing screw 11, with external groove 12 in screw 11, and an internal helical groove 14 in the body 13 of nut structure 10. Balls 15 fill the load raceway formed by the mating helical grooves 12 and 14. The balls 15 being slightly smaller than the raceway.

Intermediate of the outer ends of the nut body 13 is a structure, which in this instant is an annular groove 16 forming a reduced area 17, to maintain the both sides of the nut body 13 in angular registered relation to resist rotary motion relative to each other. An internal groove 18 may be formed to further reduce the section 17 to a uniform section.

An internal threaded ring 19 encircles the nut body 13, and in coacting relation with a flange 21 at one side of section 17, and adjustable axially by the mating screw thread 22 on flange 21. A wrench slot 20 is provided on the periphery of the ring 19 for actuation of the thread mechanism 22. Another flange 23 on the opposite side of the section 17 with an outward radial surface 24 to abut a radial surface of a flange 25 of the ring 19.

A bolt flange 26 on the nut body 13 is provided for bolting on a machine element 27, by bolts 28 and dowel pins 29.

On each side of the reduced section 17 are independent circuits of balls 15 in the raceway of the grooves 12 and 14, including ball return structures 30, indicated by phantom lines. A single return circuit may be used and balls 15 guided under groove 18 by the external helical grooves 12 of the screw 11.

In the preloading operation a spanner wrench (not shown) is applied in slot 20 and torqued to move ring 19 by the screw threads 22, to force the flange 25 against the surface 24 of flange 23. The rotary adjustment of ring 19 forces the ends of the nut body 13 inwardly compressing the material of section 17 therebetween reducing the length of section 17 until the end play of the nut 10 on screw 11 is removed. Further adjustment will preload the balls 15 in the raceway of grooves 12 and 14, and the balls 15 will contact the grooves along the centerlines 31 and 31', respectively in each circuit, inclined at an angle directed toward the center of the nut body 13.

A setscrew 32 in ring 19, with a soft plug 33 on the threads 22, for locking the ring 19 to the nut body 13 at the desired preload. The setscrew can be loosened and ring 19 further adjusted at any time without removing the ball-bearing screw and nut mechanism from the machine.

FIG. 2 is a modification of my invention, similar in structure to FIG. 1, but with intermediate section 17' stressed in tensile stress. Two radial flanges 35 and 36 provided on either side of section 17'. An internal threaded ring 37 coacting with flange 36 by the screw thread mechanism 38. A spanner wrench (not shown) is applied on ring 37 in slots 39, and adjusted to move the ring 37 axially by the screw thread mechanism 38 to abut the flange 35, forcing the two flanges 35 and 36 outward to deform section 17' therebetween in tensile stress. The ring 37 is adjusted until the end play of the nut body 13' on the screw 11' is removed, and further adjustment is made for proper preloading. The balls 15' will contact the grooves 12' and 14' in the raceway along centerlines 40 and 40' respectively on each side of the section 17' but inclined at angles opposite as shown in FIG. 1.

Sections 17 and 17' of the above forms of my invention, either in compression or tensile stress, will be deformed at least partially within the elastic limit of the material, and adjustment for decreased preload can be made by the elastic recovery of the material when the rings 19 or 37 are backed off.

Another important feature is that all loads transmitted by the nut body 13 or 13' is taken by the rings 19 or 37, respectively, on their respective flanges 23 or 35, to provide maximum rigidity. Sections 17 and 17' are strained in the opposite direction of the applied load.

FIG. 3 is another modification of my invention, which consist of a nut structure 45 and a coacting screw 46. The nut 45 fits into a bored hole 48 in an element of a machine 47. The nut 45 includes portions 49 and 50 on either side of an annular groove 51. At the groove 51 is a reduced section 52. A key 53 and a screw 54 retains portion 49 of nut 45 in bore 48.

To preload the nut 45 on the screw 46, the tool 55 is torqued in either direction to deform the section 52 in torsional stress. One direction will shorten the section 52, the opposite direction will elongate the section 52, relative to the helical load groove coacting with the balls 60 therein. When the proper preload is attained the set screw 56 is tightened on a soft plug 57 to lock portion 50 in place. A single recirculating system 61 is provided for the balls 60.

FIG. 4 is another modification of my invention, which is similar to the actuating mechanism of FIG. 2, but this actuating mechanism is in the form of a ring insert between two ball-bearing nuts.

A ring section 64 with a reduced area 65 is fastened between two nut bodies 66 and 67, by pins 68 and 69, respectively, to form a unitary structure similar to the structure shown in FIG. 2. An internal threaded ring 70 coacting with the threads 71 on the inserted ring section 64 to adjust the length of reduced area 65 in tensile stress. Ring section 64 can be made of material different than that of the nut bodies 66 and 67 which may be more suited for its function. The ring section 64 can be machined directly on the body 67 integral thereon.

The flange 74 upon which the ring 70 abuts may extend within the diameter of the nut bodies 66 and 67, and mounted as taught in FIG. 3. The flange 74 may be extended beyond the diameters of the nut bodies 66 and 67 and mounted as illustrated in FIG. 4 on a machine element 75.

FIG. 5 is another modification of my invention similar to FIG. 2, but in two separate nut bodies 80 and 81 each integral with annular members 82 and 83, respectively. Annular member 82 includes an internal screw thread 84 coacting with an external screw thread 85 of annular member 83. A reduced section 86 in annular member 83 is provided between external screw thread 85 and radial surface 87. Spanner wrench holes 89 and 90 are provided in bodies 80 and 81, respectively.

The end surfaces 87 and 88 are so spaced in relation to the ball grooves of the respective nut bodies 81 and 80 so as to be initially assembled in the abut position with resulting end play in the grooves 12''. Thus a liberal tolerance for fabrication will be provided which can be controlled in the manufacturing procedure without resorting to special skill and handling.

To preload, the nut bodies 80 and 81 are rotated relative to each other, by a spanner wrench in holes 89 and 90, to stress the reduced section 86 in tensile stress and elongating it, as the end surfaces 88 and 87 are in abutment, until all of the end play of the unitary nut structure 80–81 has been removed in relation to the screw groove 12''. Further rotation will preload the nut structure to any desired load value.

The annular rings 82 and 83 may be made as two rings separate from the nut structures 80 and 81, respectively, and fastened in place similar to that shown in the modification of my invention shown in FIG. 4.

While the preloaded ball-bearing screw and nut mechanism herein shown and disclosed in detail is fully capable of attaining the objects and providing the advantages hereinbefore stated, it is to be understood that it is merely illustrative of the present preferred embodiments of the invention and no limitation are intended to the details of construction or design herein shown other than as defined in the appended claims.

1. A ball-bearing screw and nut mechanism comprising a ball-bearing screw with an external groove, a ball-bearing nut structure with an internal groove, said grooves mating to form a working ball raceway, balls in said raceway, a structural means at an intermediate section of said nut structure to maintain the sides thereby in unitary assembly, and actuating means independent of said ball-bearing screw to adjustably change the relative position of said sides of said nut structure, to change the relative position of said internal groove in said nut on each side of said structural means relative to said external groove of said screw, to thereby remove the end play of said nut structure to said screw.

2. A ball-bearing screw and nut mechanism as defined in claim 1, wherein said structural means includes a rigid deformable section to connect each of the said sides of said nut structure in fixed relation with each other to be deformed by said actuating means.

3. A ball-bearing screw and nut mechanism as defined in claim 1, wherein said structural means includes a rigid member to key said sides of sand nut structure in relative angular relation on said screw, and said actuating means includes an annular member axially actuated.

4. A ball-bearing screw and nut mechanism as defined in claim 1, wherein said actuating means includes an annular member utilizing the mechanical advantages of a coacting screw thread mechanism to be axially actuated against a radial surface of said nut structure in close proximity of said structural means.

5. A ball-bearing screw and nut mechanism as defined in claim 4, wherein said annular member abridges said intermediate section of said nut structure between said screw thread mechanism and said surface to form a rigid structure therebetween prestressed by the relative compressive and tensile stresses in said annular member and said intermediate section.

6. A ball-bearing screw and nut mechanism as defined in claim 5, wherein said annular member is rotatable with one said side of said nut structure, and said other side is rotatable with said radial surface.

7. A ball-bearing screw and nut mechanism as defined in claim 1, wherein said structural means includes a screw mechanism on one side of a deformable section, and a surface on the other side of said deformable section within the ends of said ball-bearing nut structure, adjustment of said actuating means by said screw thread mechanism against said surface to deform said deformable section therebetween.

8. A ball-bearing screw and nut mechanism as defined in claim 7, wherein said deformable section is rotatable with one of said sides of said nut structure, and said actuated means is rotatable with the other side of said nut structure, so that rotary relation therebetween deforms said deformable section (permitting relative rotation of said sides of said nut structure) to preload said nut structure on said ball-bearing screw.

9. A ball-bearing screw and nut mechanism as defined in claim 1, wherein said structural means includes a rigid deformable section, and said actuating means axially adjustable to strain said deformable section to form a prestressed section thereby to exceed any applied load thereon.

10. A ball-bearing screw and nut mechanism as defined in claim 9, wherein said actuating means to deform said deformable section includes a mechanism to stress said deformable section in compression to adjustably decrease said deformable section in axial length.

11. A ball-bearing screw and nut mechanism as defined in claim 9, wherein said axially actuating means to deform said deformable section includes a mechanism to stress said deformable section in tensile stress to adjustably increase said deformable section in axial length.

12. A ball-bearing screw and nut mechanism as defined in claim 9, wherein said actuating means to deform said deformable section includes a mechanism to stress said deformable section in torsional stress by rotation of one said side of said nut structure in relative angular relation to the other said side of said nut structure.

13. A ball-bearing screw and nut mechanism as defined in claim 9, wherein said nut structure has two independent recirculating systems coacting with said rigid raceway to form two closed circuit of balls therein, each on opposite sides of said deformable section.

14. A ball-bearing screw and nut mechanism as defined in claim 9, wherein said structural means is formed as a separate ring structure retained between two independent ball-bearing nuts each with independent recirculating systems of balls, to form a unitary nut structure thereby.

* * * * *

UNITED STATES PATENT OFFICE
CERTIFICATE OF CORRECTION

Patent No. 3,638,507  Dated February 1, 1972

Inventor(s) Harry Orner

It is certified that error appears in the above-identified patent and that said Letters Patent are hereby corrected as shown below:

On the cover sheet [72] Inventor: "Glenn" should read -- Glen -- . Column 1, line 5, "2,982,125" should read -- 2,982,145 -- . Column 2, line 10, "setscrew" should read -- set screw -- . Column 3, line 52, "sand" should read -- said -- . Column 4, cancel line 25; lines 30 and 31, "section, second occurrence, should read -- construction -- ; line 50, cancel "rigid"; line 51, after "said" insert -- rigid -- .

Signed and sealed this 14th day of November 1972.

(SEAL)
Attest:

EDWARD M. FLETCHER, JR.
Attesting Officer

ROBERT GOTTSCHALK
Commissioner of Patents